Jan. 6, 1948. V. MORRILL, JR Re. 22,961
LIQUID PRODUCT AND THERMOSTATIC DEVICE EMBODYING SAME
Original Filed Oct. 26, 1943
Fig. I.
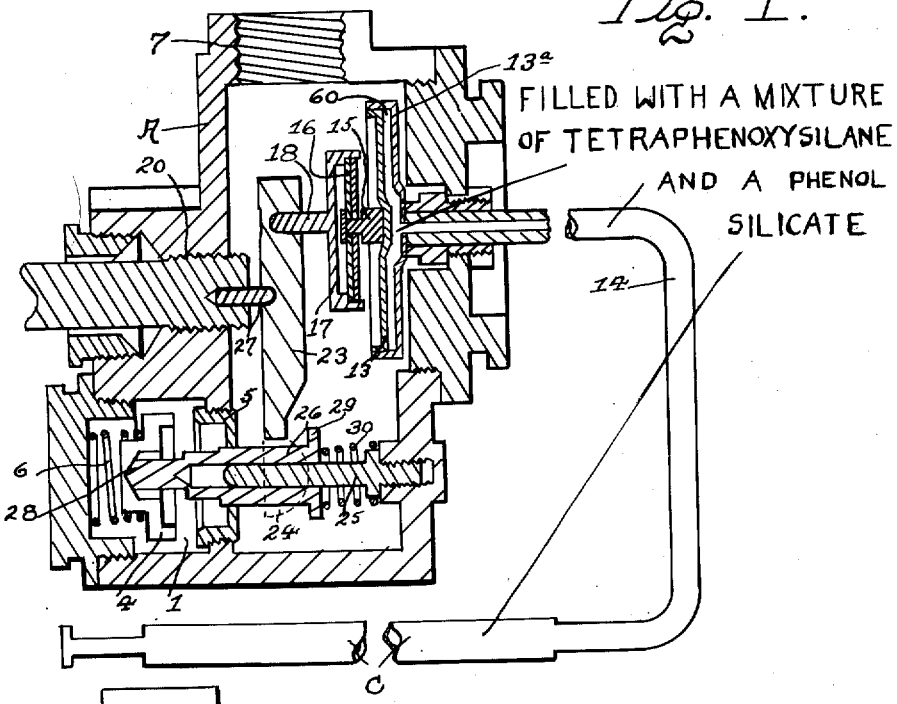
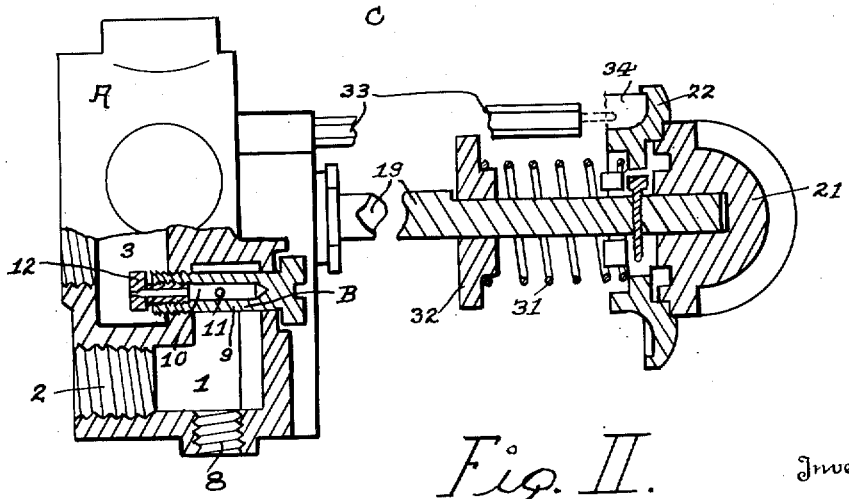
Fig. II.
Inventor
Vaughan Morrill, Jr
By Patterson, Wright & Patterson
Attorneys Reissued Jan. 6, 1948

Re. 22,961

UNITED STATES PATENT OFFICE 22,961

LIQUID PRODUCT AND THERMOSTATIC DEVICE EMBODYING SAME

Vaughan Morrill, Jr., St. Louis, Mo., assignor to American Stove Company, St. Louis, Mo., a corporation of New Jersey Original No. 2,413,513, dated December 31, 1946, Serial No. 507,764, October 26, 1943. Application for reissue November 4, 1947, Serial No. 784,067

2 Claims. (Cl. 297—3)

This invention relates to a new liquid product, and to thermostatic devices embodying said product.

The new liquid is the product which results from a mixture of a phenol silicate or of phenol silicates with tetraphenoxysilane. The product resulting from this mixture is a liquid having the hereinafter specifically described attributes which render it useful in many fields, and particularly useful as a thermo-responsive medium in heat responsive devices.

All of the uses to which the new liquid product can be advantageously put are not known at the present stage which has been reached by research. The product will be useful wherever a liquid having a high stability over a wide temperature range is desired. The product will also be useful if a liquid is desired which has not only high stability over a wide temperature range, but additionally remains liquid at a low temperature and will not corrode stainless steel, iron, copper or brass.

The attributes of the new product are such as to render the product particularly useful as a thermo-responsive medium in heat-responsive devices and its use as such is hereinafter particularly described but this use is to be considered only illustrative and not restrictive of the uses of the product.

In order to produce the new product a phenol silicate or any one or more of the group of phenol silicates are mixed with tetraphenoxysilane. Tetraphenoxysilane can be bought in the open market. The phenol silicates are obtained in the following manner. A phenol is chemically reacted with one or more or all of the group of silicon oxychlorides. The group of silicon oxychlorides is composed of the following products, the formulas of which are as follows:

$$Si_2OCl_6$$
$$Si_3O_2Cl_8$$
$$Si_4O_4Cl_8$$
$$Si_4O_3Cl_{10}$$
$$Si_5O_4Cl_{12}$$
$$Si_6O_5Cl_{14}$$
$$Si_7O_6Cl_{16}$$

These silicon oxychloride products are all members of a group consisting of $Si_4O_4Cl_8$ and products having the general formula $Si_nO_{n-1}Cl_{2n+2}$ where "$n$" is greater than "1."

The mixture evolves hydrogen chloride. The mixture is heated and when its temperature has reached approximately 400° F. substantially all the hydrogen chloride has been driven off. Heating of the mixture is continued up to approximately 850° F. and between that temperature and 400° F. the phenol silicates are boiled off. These phenol silicates are collected and condensed as a clear to amber colored liquid.

If each of the individual silicon oxychloride products is individually processed by the aforedescribed chemical reaction with a phenol the following phenol silicate products are obtained.

$$Si_2O(C_6H_5O)_6$$
$$Si_3O_2(C_6H_5O)_8$$
$$Si_4O_3(C_6H_5O)_{10}$$
$$Si_4O_4(C_6H_5O)_8$$
$$Si_5O_4(C_6H_5O)_{12}$$
$$Si_6O_5(C_6H_5O)_{14}$$
$$Si_7O_6(C_6H_5O)_{16}$$

All of these phenol silicates fall within the general formula:

$$Si_nO_{n-1}(C_6H_5O)_{2n+2}$$

where "$n$" is greater than one, with the exception of the cyclical compound $Si_4O_4(C_6H_5O)_8$. Thus, although the cyclical compound does not have the general formula it should be included with it because it is well known in the chemical art that this silicate is of the same group with the other phenol silicates and that it would be so recognized is evidenced by the article of Schumb and Holloway referred to in my companion application Serial No. 507,763 filed October 25, 1943, now Patent No. 2,416,531, dated February 25, 1947.

It is difficult to separate the silicate oxychlorides into the separate products making up the group and if the entire group of silicon oxychlorides are chemically reacted with a phenol, in the manner described, the resulting product constitutes the entire group of phenol silicates and the separation of this group into the separate products making up the group is also difficult.

By reason of the difficulty of separating the silicon oxychloride group and the phenol silicate group into its separate products and for the very important reason that the separate products of the groups are so very similar as to make the products individually unimportant so far as the final product constituting this invention is concerned the entire group of silicon oxychlorides would be preferably processed so that the resulting phenol silicate compound would be made up of all of the individual products constituting the group of phenol silicates.

This practice would be followed for the reasons of economy in the production of the phenol silicates but it is to be understood that the hereinafter described results of a mixture of phenol silicate with tetraphenoxysilane would be obtained whether the phenol silicate used is one of the specific products making up the entire phenol silicate group or whether the phenol silicate used is two or more or all of the specific phenol silicate products of the entire group.

Accordingly a phenol silicate or one or more of the products making up the group of phenol silicates is mixed with tetraphenoxysilane. The resulting mixture is the new liquid product of the present invention and this new product will remain stable over a range of temperatures from zero °F. to 800° F. The product is non-corrosive to stainless steel, iron, copper or brass. The proportion of phenol silicate to tetraphenoxysilane can vary from 5% to 50% phenol silicates. The percentage of phenol silicates in the mixture will be dependent upon the viscosity desired in the final resulting product. The greater the proportion of phenol silicates to tetraphenoxysilane the higher the viscosity of the final product. Thus it will be seen that the phenol silicates are dissolved in the tetraphenoxysilane.

The final product is a chemical mixture which has no tendency to separate.

In addition to giving the tetraphenoxysilane a stability over a much wider temperature range than is inherent in the tetraphenoxysilane alone the mixture of the phenol silicates with the tetraphenoxysilane lowers the melting point of the tetraphenoxysilane from 120° F. to below 32° F. when the mixture is as little as approximately 10° phenol silicate while the use of approximately 30% phenol silicates in the mixture drops the melting point of tetraphenoxysilane to below zero °F.

In the accompanying drawing thermostatic use of the new liquid product is illustrated.

In the drawing:

Fig. 1 is a sectional view through an automatic thermo-responsive heat regulator embodying the present invention.

Fig. 2 is a view, partly in section, illustrating the gas by-pass and illustrating the temperature setting dial of the device.

Because cooking ranges today are almost universally provided with an automatic thermostatic temperature control for their ovens and, for a large part are provided with an automatic main burner ignition which requires the inclusion of a thermostatically operated safety fuel control valve as a safeguard against explosion, a temperature responsive device is a necessary part of the ranges.

For the most part both the thermostatic oven temperature control and the thermostatically operated safety control valve embody heat responsive devices of the so-called liquid type, so named for the reason that a liquid constitutes the thermal-responsive medium which operates the mechanical or other like parts of the devices to accomplish the desired result.

Because the new liquid product has attributes making it particularly suitable for and highly efficient in connection with the aforementioned heat responsive devices such as are found on gas ranges the following description is limited to the use of the new product to gas ranges, but it is to be understood that the product is not to be limited to such uses because the product provides a means of thermostatic response to the heat generated by any type of device and particularly for response to high temperatures. Furthermore the accompanying drawing is not to be considered as restrictive of the invention for the reason that thermostatically operated heat control devices and safety valves of the liquid type can and do vary widely in construction and consequently the accompanying drawing is to be considered merely illustrative and not in any sense limitative of the invention.

Devices of the character described have proven far from satisfactory in that the thermo-responsive fluids which have been utilized has necessitated or confined the satisfactory use of these devices to temperatures not in excess of 550° F. while it is necessary, as will hereinafter appear, to deal with and control temperatures which are in excess of 650° F.

As a general statement it can be said that devices of the character here dealt with have in the past been objectionable, inefficient and not commercially adaptable for use in connection with high temperature work because the thermo-responsive medium of the devices has had too low a decomposition temperature; has had a low boiling point; has had high vapor pressure and high cost; has so greatly restricted the operating temperatures of gas ranges as to curtail undesirably the functions of the ranges; along with other specific objections as will hereinafter appear.

With devices of the character described as heretofore known and in use, the thermo-responsive liquids of the devices are quite apt to and frequently do break down or decompose and render the devices inoperative if the thermo-responsive medium is subjected to a temperature in excess of 650° F. It has been found that in range ovens, particularly in ranges used in hotels, restaurants and the like, temperatures in excess of 650° F. are often necessary in order to braise and sear meats.

In many ranges, particularly domestic ranges, a single oven and a single burner, which burner is under the control of the baking oven temperature regulator, are utilized for both baking and broiling operations. The temperature necessary to be reached for successful and proper broiling operation is much higher than that utilized in baking operations but since the thermo-responsive element of the control device is in the combination baking and broiling oven and responsive to the heat generated therein it is often difficult if not impossible, with control devices utilizing any of the liquid thermo-responsive mediums heretofore in use, to reach the desired broiling temperature or if it is reached the life of the temperature control device is shortened or destroyed by the intense heat to which the thermo-responsive medium of the baking oven temperature control device is subjected. In many instances it is impossible to reach the desired broiling temperature because the thermo-responsive medium sets up a throttling action on the gas flowing to the combined broiler and baking burner.

The lives of devices of the character here being discussed as made in the past and at the present time are also jeopardized in another manner and which when it occurs will in the majority of instances completely destroy the devices by rendering them so inaccurate as to amount to rendering them inoperative. In the manufacture of ranges the heat control devices are calibrated at the factory and if for any reason during use the devices become inaccurate they are re-calibrated by service men. Either at the factory or by the service men's carelessness or mistake in setting a calibration by over-adjustment will permit the range burner or burners to generate in the range ovens a temperature much in excess of 650 degrees and when this occurs the value of the thermo-controlled devices is destroyed.

From the foregoing it will be seen that in domestic ranges and particularly combination oven and broiler ranges and in respect to safety valves, it is desirable to have a thermostatically controlled temperature range greater than the hereinbefore normal range of 250° F. to 550° F.

The present new improved liquid product constitutes a thermo-responsive liquid or medium which will remain stable over the wide range of temperatures recited and therefore constitutes a very efficient liquid fill for the thermo-responsive devices used in gas ranges. The product has not only this stability but has the other desirable attributes of a high boiling point and the ability to remain liquid down to an exceedingly low temperature combined with the fact that the product is not corrosive of stainless steel, iron, copper or brass. These attributes assure that the heat control devices will operate accurately and have great durability.

Explaining now the particular use of the aforementioned materials as a thermo-responsive medium in a domestic oven automatic temperature control device, and referring particularly to Figs. 1 and 2 of the drawing which illustrate a commercially practical liquid type oven heat regulator, A designates a housing to the chamber 1 to which fuel is delivered from a suitable source of supply through an inlet 2. Fuel is permitted to pass from the housing chamber 1 to a larger adjacent housing chamber 3 under the control of a valve 4 which is normally urged towards its seat 5 by a spring 6. The chamber 3 delivers fuel to the oven or other burner with which the device is associated through its outlet 7.

Ordinarily the range is equipped with a constant burning pilot light and fuel for said pilot is delivered from the housing inlet chamber 1 through a pilot outlet opening 8.

Those familiar with automatic oven temperature control are aware that the device being explained acts to control the delivery of fuel to the oven burner when the desired temperature within the oven has been obtained and operates to permit the flow of fuel to said oven burner until said predetermined temperature is reached and will operate to permit the flow of fuel after the predetermined temperature has been reached in the oven and then the over temperature falls off. However it is ordinary practice not to shut off the fuel completely to the oven burner during the use of the oven but to at all times permit a very low fire at the burner. This is accomplished by providing a bypass and this is designated as an entirety in Fig. 2 of the drawing at B. This bypass comprises a bolt 9 having therein a passageway 10 which is in communication with the fuel inlet chamber 1 through an opening 11. The passageway 10 of the bolt discharges into the fuel outlet chamber 3 through a suitable nozzle 12.

The regulator housing A and the parts therein can if desired be positioned remote to the oven or other chamber the heat in which is to be controlled but within said oven or chamber there is positioned a metallic bulb C which is connected to an expansible chamber composed of a pair of diaphragms 13 and 13*a* positioned in the housing by a tube 14.

The chamber, tube and bulb are completely and entirely filled with the present new liquid product as a thermo-responsive medium and it has been found that to obtain the best and most accurate operation the tube, bulb and chamber should be evacuated and filled with the thermo-responsive medium under a high vacuum so as to exclude all air.

As will appear the device operates by reason of the expansion and contraction of the thermo-responsive medium in response to the temperature to which the bulb and tube or any portion of the thermo-responsive medium carrying parts of the device are subjected. The operation is limited however entirely to the expansion and contraction of the thermo-responsive medium itself and there is a complete absence of the generation of any vapor pressure within the closed system which contains the thermo-responsive medium or material.

The chamber diaphragm 13 is provided with an extending pin or stud 15 having attachment to a disc 16 carried in separated relationship to the bottom of a housing or carrier 17 from which extends a stud or pin 18.

The disc and its housing constitute a compensator to compensate any response or action of the thermo-responsive medium to heat exterior of the oven so as to assure that the device responds only to the temperature within the oven or chamber within which the temperature is to be controlled. Further description of this element of the device is unnecessary as compensators are well understood by those familiar with inventions of the present character.

An operating shaft 19 has its inner end rotatably mounted within the housing A as at 20 and its other end carries an operating handle 21 which will be conveniently positioned as for instance on the front panel of the range. A dial 22 is associated with the operating handle and will carry on its face temperature indications up to the maximum temperature range of which the device is capable of operation.

Within the fuel discharge chamber 3 of the housing a lever 23 at one end bears against the compensator stud or pin 18 and has its other end forked as at 24 to straddle a fixed stem 25 and the valve operating sleeve 26 which is mounted for reciprocation on said fixed stem. Intermediate its length the lever is fulcrumed on a pin or stud 27 carried by the inner end of the temperature setting shaft 19.

The valve operating sleeve 26 has one end 28 engaging the valve in opposition to the spring 6 while its opposite end is provided with a head 29 behind the forked end of the lever. Behind the sleeve head 29 a coil spring 30 having a tension greater than that of the spring 6 tends through the valve sleeve to normally hold the valve in an open position.

Thus it will be seen that when the thermo-responsive fluid within the closed system expands it will assert a pressure upon the lever 23 to rock said lever on its fulcrum 27 and move its forked end against the tension of the coil spring 30 and thus permit the valve 4 to move toward or to its seat under the tension of the coil spring 6. Reduction in temperature and the consequent contraction of the thermo-responsive medium will permit the spring 30 to move the valve away from its seat, all as is well understood by those familiar with devices of the present nature.

The present device provides for calibration both at the time of manufacture and while in use in the field. The temperature dial 22 is geared for rotation with the operating handle 21 and these two parts are held normally in operative engagement under the tension of the coil spring 31 which is abutted against a collar 32. To calibrate or adjust it is only necessary to push the dial inwardly and rotate it either to the right or to the left in accord with the error to be corrected.

An elongated stop pin 33 is carried by the housing A and is in the path of travel of an extending ear or lug 34 carried on the rear face of the dial 22. This construction will limit the permissible rotation of the temperature setting portion of the apparatus.

It will be understood that in a gas range construction the bulb C and the thermo-responsive material therein contained is subjected to the heat of the pilot light burner in addition to the heat built up in the oven by the operation of the main burner and that consequently the thermo-responsive medium must be such as to withstand temperatures of exceedingly high degrees.

I claim:

1. A new liquid product characterized by remaining stable through a temperature range of from 0° F. to 800° F. consisting essentially of a mixture of tetraphenoxysilane and a phenol silicate selected from the group consisting of $Si_4O_4(C_6H_5O)_8$ and phenol silicates having a boiling range of 400° to 850° F. and falling within the general formula $Si_nO_{n-1}(C_6H_5O)_{2n+2}$, where "$n$" is greater than 1, the phenol silicate component comprising from 5 to 50% of said liquid product.

2. In a thermostatically operated device for use over a wide range of temperature from a low of at least 0° F. to a high of approximately 800° F., a bulb in the zone of heat, an expansive and contractible chamber, a conduit interconnecting the bulb and chamber, said thermostatic medium comprising a liquid product characterized by remaining stable over a range of from 0° F. to 800° F. and being noncorrosive to stainless steel, iron, copper or brass, said liquid product consisting essentially of a mixture of tetraphenoxysilane and a phenol silicate selected from the group consisting of $Si_4O_4(C_6H_5O)_8$ and phenol silicates having a boiling range of 400° to 850° F. and falling within the general formula $Si_nO_{n-1}(C_6H_5O)_{2n+2}$ where "$n$" is greater than 1, the phenol silicate component comprising from 5 to 50% of said liquid product.

VAUGHAN MORRILL, Jr.